United States Patent [19]

Simionato

[11] Patent Number: 5,778,641
[45] Date of Patent: Jul. 14, 1998

[54] DEVICE FOR SEALING BAGS OR PACKAGES IN A HEAT-SEALABLE PLASTIC MATERIAL

[75] Inventor: Paolo Simionato, Padua, Italy

[73] Assignee: Simionato S.p.A., Padua, Italy

[21] Appl. No.: 749,648

[22] Filed: Nov. 15, 1996

[30] Foreign Application Priority Data

Dec. 6, 1995 [IT] Italy .................. MI95 A 002575

[51] Int. Cl.⁶ .................................................. B65B 9/06
[52] U.S. Cl. .................................. 53/551; 156/308.4
[58] Field of Search ........................... 53/373.7, 374.3, 53/373.4, 373.5, 373.6, 551, 552, 550, 553, 554, 548; 156/308.4, 466, 217, 218

[56] References Cited

U.S. PATENT DOCUMENTS

| | | | |
|---|---|---|---|
| 4,713,132 | 12/1987 | Abel et al. | 156/308.4 |
| 4,833,864 | 5/1989 | Schnippering et al. | |
| 5,279,098 | 1/1994 | Fukuda | |
| 5,622,033 | 4/1997 | Fukuda | 53/551 |
| 5,685,131 | 11/1997 | Spatolisano et al. | 53/373.7 |

FOREIGN PATENT DOCUMENTS

| | | |
|---|---|---|
| 0 736 456 | 10/1996 | European Pat. Off. . |
| 0 738 582 | 10/1996 | European Pat. Off. . |
| 37 15 146 | 12/1988 | Germany . |
| 39 19 642 | 12/1990 | Germany . |
| 1 389 746 | 4/1975 | United Kingdom . |

*Primary Examiner*—John Sipos
*Assistant Examiner*—John Paradiso
*Attorney, Agent, or Firm*—Young & Thompson

[57] ABSTRACT

A device for welding bags in a heat-sealable plastic material comprising two transverse welding parts (18, 18) carried by respective mobile support elements (20, 20) and means for driving the motion of said support elements, comprising at least, for each of said welding elements (18,18), a rotation drive shaft (26), a train-holder element (28) connected integrally to said drive shaft (26) to rotate together with the latter, a fixed cogged sun wheel (30) integral with the support structure (17), a first cogged planet wheel (32) integral with said element for supporting the welding part (20) and connected freely rotatingly around its own axis to said train-holder element (28) and driven to rotate by the latter, and a second intermediate cogged planet wheel (34) attached to said train-holder element (28) freely rotatingly around its own axis and driven to rotate by the latter. The intermediate planet wheel (34) meshes on said fixed cogged sun wheel (30) and with the first cogged planet wheel (32) of the shaft (20) holding the welding part (18) in such a way that, following rotation of said drive shaft (26), each welding part (18) is driven to perform circular trajectories, always remaining turned in the same direction.

14 Claims, 7 Drawing Sheets

DEVICE FOR SEALING BAGS OR PACKAGES IN A HEAT-SEALABLE PLASTIC MATERIAL

FIELD OF THE INVENTION

The present invention relates to a device for welding bags or packages in a heat-sealable plastic material, preferably used in packaging machines wherein a tubular strip is longitudinally fed and filled progressively with predetermined portions of product, while said welding device, by welding the opposite edges of said tubular strip, defines a plurality of packages individually containing said predetermined portion of product.

BACKGROUND OF THE INVENTION

Traditional welding devices comprise two transverse welding parts outside of said strip, carried, one opposite the other, by respective mobile support elements which are moved alternately forwards or backwards, or along opposite circular trajectories so as to allow said welding parts to engage one against the other to weld the strip and respectively move away to allow the strip containing the product package to pass between them.

More particularly, known welding devices include some wherein the welding parts perform cyclically a complete turn of 360° on themselves before arranging parallel and opposite in order to make the weld. They are disadvantageous due to the fact that the electrical power cables used for heating the contact surfaces cannot be connected directly to the welding part, which would wind them on themselves until they are torn, but must, in order to supply electrical current to these welding parts, be connected to a collector element from which the heating part takes electrical current via sliding brushes.

Said means of transmitting electrical current, in addition to representing in themselves a cost which affects to a certain extent the cost of manufacture of the welding device, have the further disadvantage inherent in the fact that the contact brushes become worn and must be periodically replaced, with further costs due both to the actual cost of the brushes to be replaced, and due to the cost of the work force employed for these operations of replacement and periodic maintenance of this system for the transmission of electrical current. According to another welding device known from WO 91/12177, provision is made to use a system for supporting and moving welding parts of the jointed parallelogram type. In it, each welding plate or part is carried by a vertical sheet at whose vertical ends rotating cranks are jointed which allow said welding parts to perform circular trajectories, which enable them to be moved together and apart, at the same time always maintaining a horizontal position of the latter. Such a known device using a jointed parallelogram system for supporting and moving the welding parts, in addition to being in itself a complex construction, uses a considerable number of components which make the rotating system particularly heavy.

The considerable speed of packaging of the machine forces the welding system to rotate at high speeds, and as a result, due to the considerable mass of the system, as well as due to an excessive radius of rotation of the welding equipment of this device, the level of dynamic actions involved is excessive.

Therefore, with this known device, either it is decided to make the packaging machine and hence the welding device operate at high speed, however obtaining excessive mechanical stress of the system which is the cause of breakage and excessive wear of the components of the welding system or, in order to avoid this risk, the system is operated at a lower speed level, achieving however low production yields in this case.

The object of the present invention is that of providing a device for welding bags or packages in a heat-sealable plastic material which avoids the problems of similar known devices; more particularly, the object is that of providing a welding device whereby it is possible to avoid the use of collectors and sliding contact brushes or similar devices for supplying electricity to the welding parts and such that the masses in movement and the radius of rotation of the system are reduced in such a way that the welding system during operation has a low stress rate which avoids the resulting costs for maintenance, replacements of broken or worn parts and low production yields.

SUMMARY OF THE INVENTION

The previous objects are achieved by means of a device for welding bags or packages in a heat-sealable plastic material suitable for welding opposite edges of a tubular strip which is longitudinally fed and filled in sequence with a suitable portion of a product. Said welding device comprises a support structure, at least two transverse welding parts, arranged on opposite sides of said strip, carried by respective support elements moving in rotation along circular trajectories in opposite angular directions and means for driving the circular movement of said support elements; characterised in that said means for driving the circular motion of said elements for supporting the welding part comprise at least, for each of said welding elements, a rotation drive shaft, a train-holder element connected integrally to said drive shaft to rotate together with the latter, a fixed cogged sun wheel coaxial to said drive shaft, a cogged planet wheel integral with said element for supporting the welding part and connected to said train-holder element in order to be driven to rotate with the latter and rotate freely around its own axis, an intermediate cogged planet wheel integral with said train-holder element in order to be driven to rotate by the latter and freely rotate around its own axis, said intermediate planet wheel meshing on said fixed cogged sun wheel and with said first cogged planet wheel of the shaft holding the welding part, so that, following rotation of said drive shaft, said intermediate planet wheel, rotating on said fixed sun wheel, makes said planet wheel of the support element of the welding part rotate, in such a way that the respective welding part performs circular trajectories, always remaining turned in the same direction.

The use of such an epicycloidal rotary mechanism for moving each of the welding parts allows a relatively simple system to be provided and which uses a low number of components such that it entails a reduction in the masses involved and the rotation radius of the welding equipment, so as to obtain, during operation, a low level of stress and the possibility of operating the system at a high speed thus achieving high production yields.

BRIEF DESCRIPTION OF DRAWINGS

The present invention will be made clearer on reading the following description, relating to preferred embodiments of the invention, to be read with reference to the accompanying drawings, in which.

DESCRIPTION OF A PREFERRED EMBODIMENT

Figure 1:
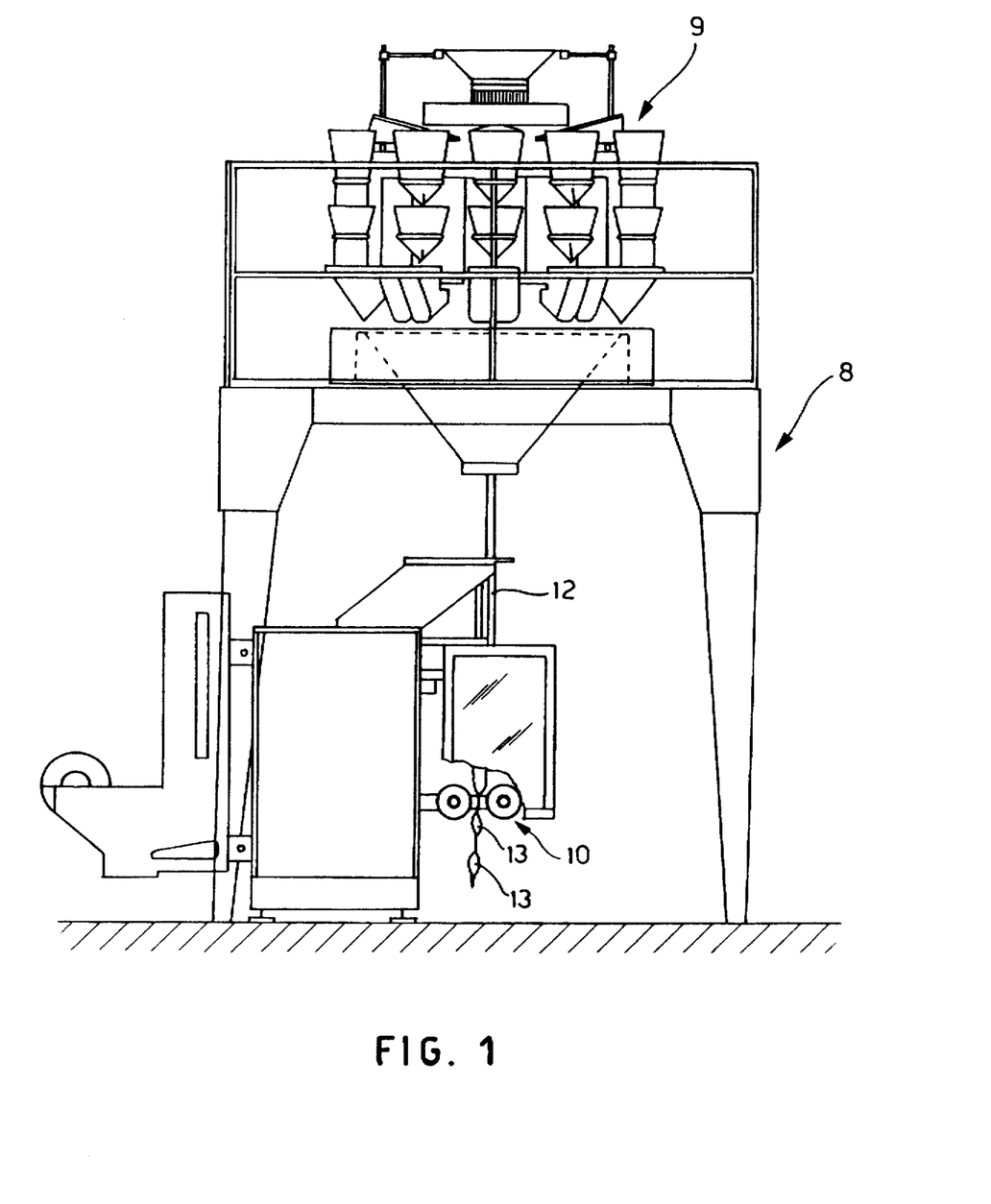
FIG. 1 is a lateral schematic view of a packaging machine with the welding device of the present invention assembled.

A packaging machine 8 with the device 10 of the present invention assembled is shown in FIG. 1. In said machine a loose product is adequately weighed and divided into portions by means of the upper unit 9 and is then poured into a tubular strip 12 which is longitudinally fed and filled progressively with said predetermined portions of product, before being sealed to define individual portions of product 13 by means of the welding device 10 of the present invention.

Figure 2:
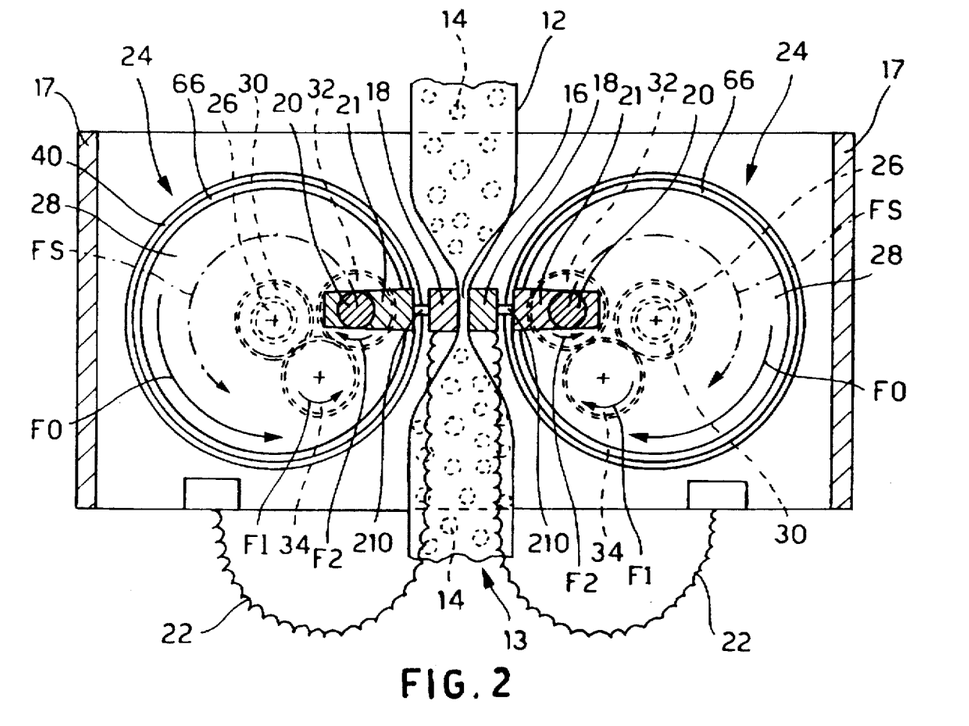
FIG. 2 is a lateral sectioned view, taken along line 2—2 of FIG. 5, of the device for welding bags according to a preferred embodiment of the present invention.

As shown better in FIG. 2, the tubular strip 12 which is longitudinally fed and filled progressively with predetermined portions of product 14, is welded in 16, by means of the welding device 10, which, by pressing and heating the opposite edges of said tubular strip 12, makes the packages 13 containing individually said predetermined portion of product 14.

Figure 5:
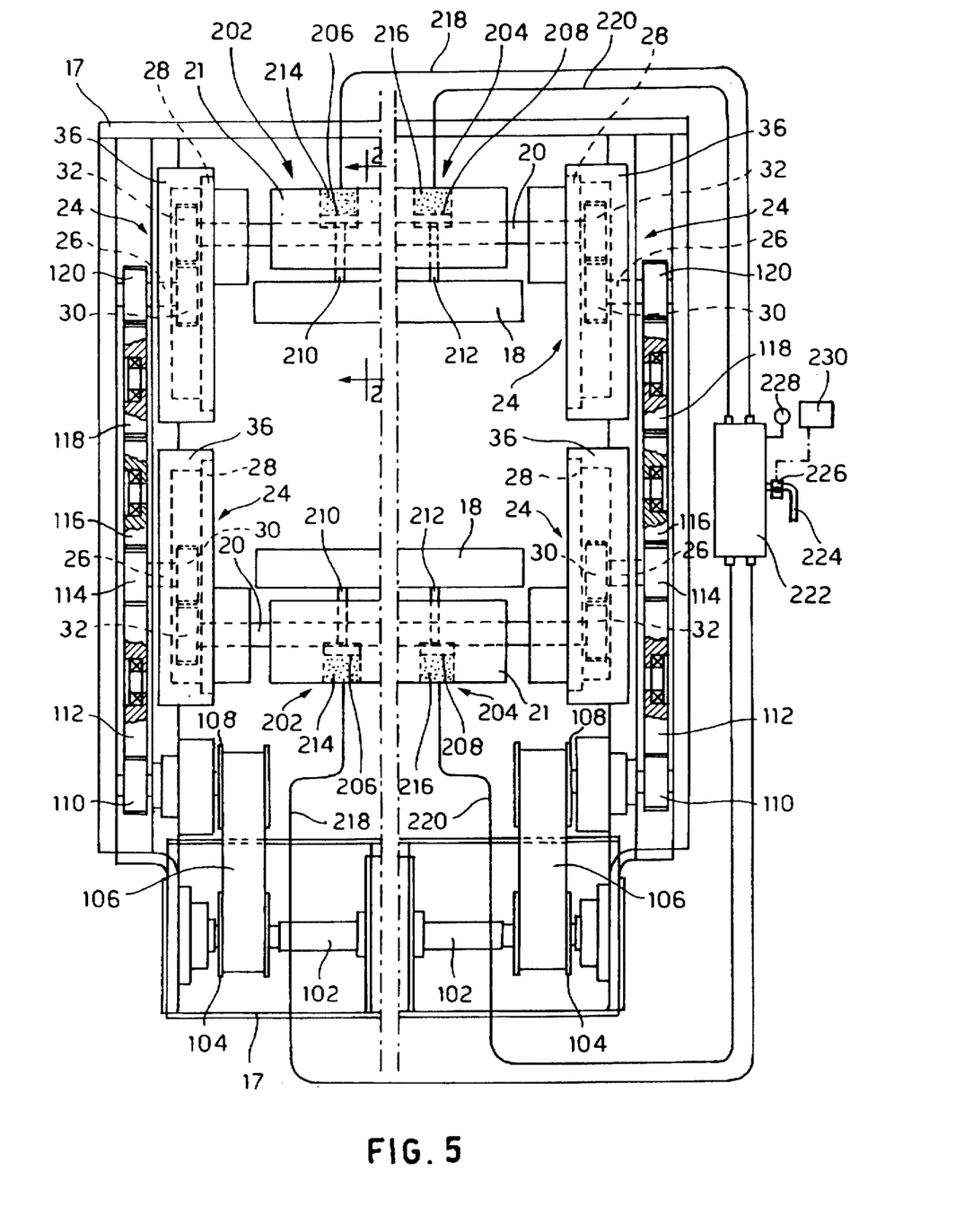
FIG. 5 is a plan view from above of the preferred embodiment of the device of the present invention.

With reference also to the subsequent FIG. 5, it can be seen that the welding device comprises, in addition to a support structure 17, two opposite and transverse welding plates or parts 18, 18, wherein said strip 12 is made to pass, and which are carried by respective support elements, denoted respectively by the reference numerals 20, 20 in the figures, by means of attachment blocks 21.

Figure 3:
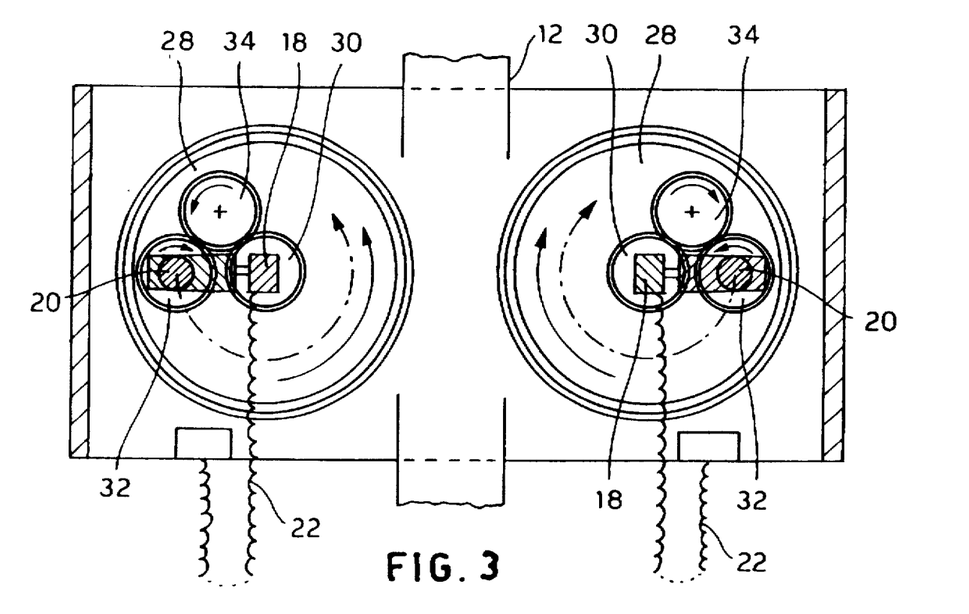
FIGS. 3 and 4 are schematic views similar to FIG. 2, illustrating different working positions of the device of the present invention.
Figure 4:
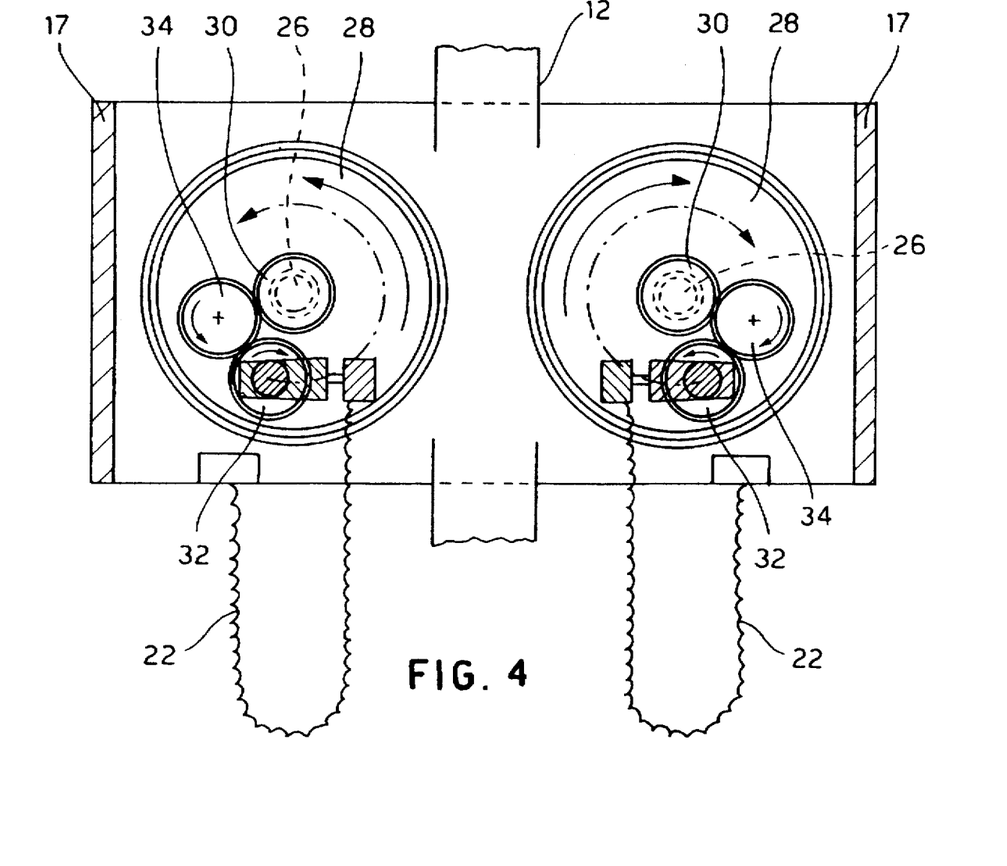

Said supports 20, 20 of said two welding plates or elements 18, 18 are driven to move synchronously along substantially circular trajectories in opposite angular directions, in such a way that said welding elements are brought close one to the other and, by pressing the edges of said tubular strip 12 one against the other for a certain longitudinal section, force them to weld and are moved away to allow passage between the welding elements themselves of said strip containing a portion of product. The sequence of FIGS. 2, 3 and 4 illustrates three different working positions of the welding parts.

The reference numeral 22 in FIG. 2 denotes electrical cables for supplying electrical current for heating the welding surfaces of said welding elements 18. Said cables perform a waving movement as shown by the sequence of FIGS. 2, 3 and 4.

The means for driving the circular motion of said elements for supporting the welding parts comprise, for each of said welding elements 20, two substantially identical drive assemblies 24 situated at the opposite lateral ends of each welding part.

Figure 6:
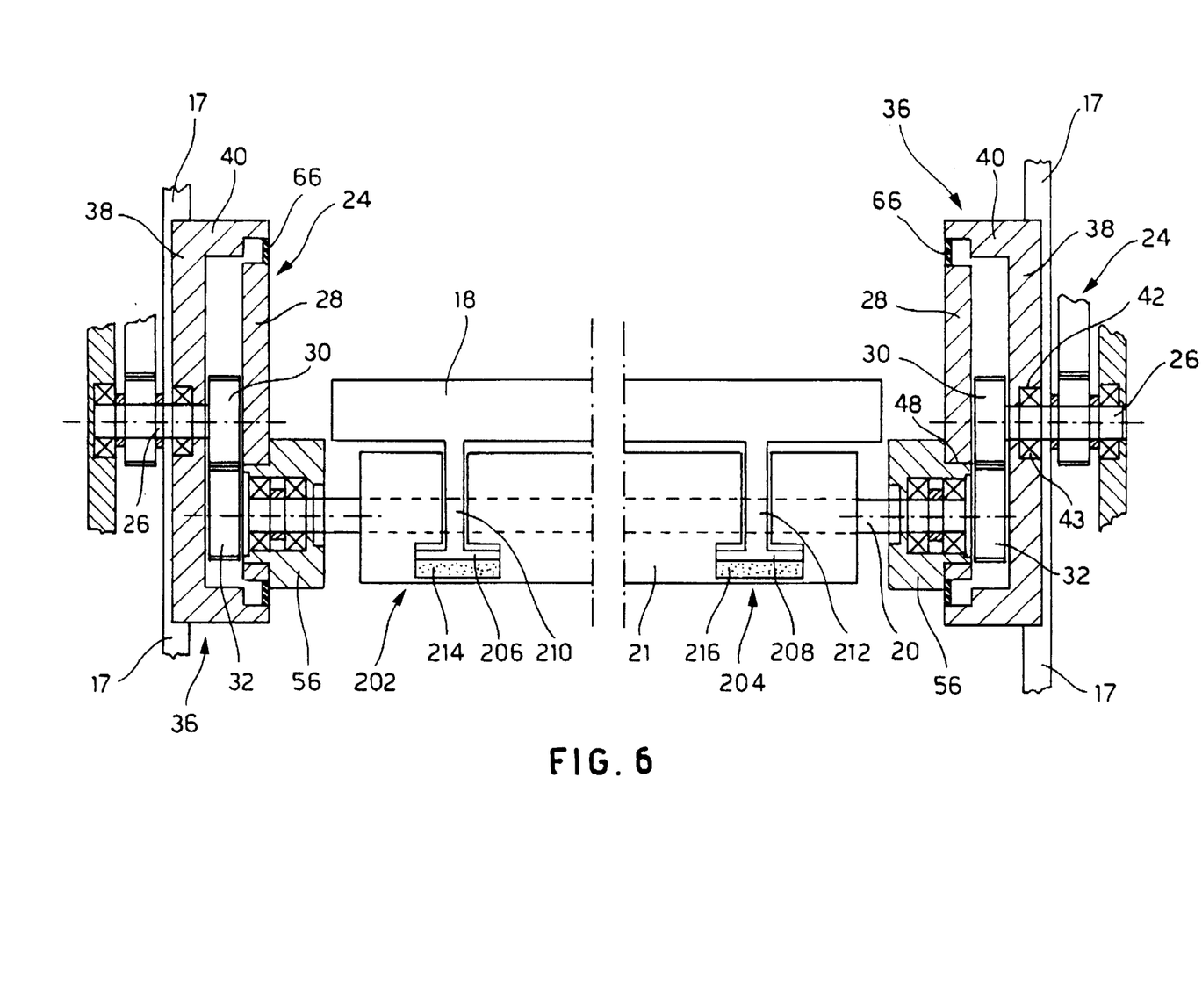
FIG. 6 is a sectioned view from above, relating to half of the device of the present invention.
Figure 7:
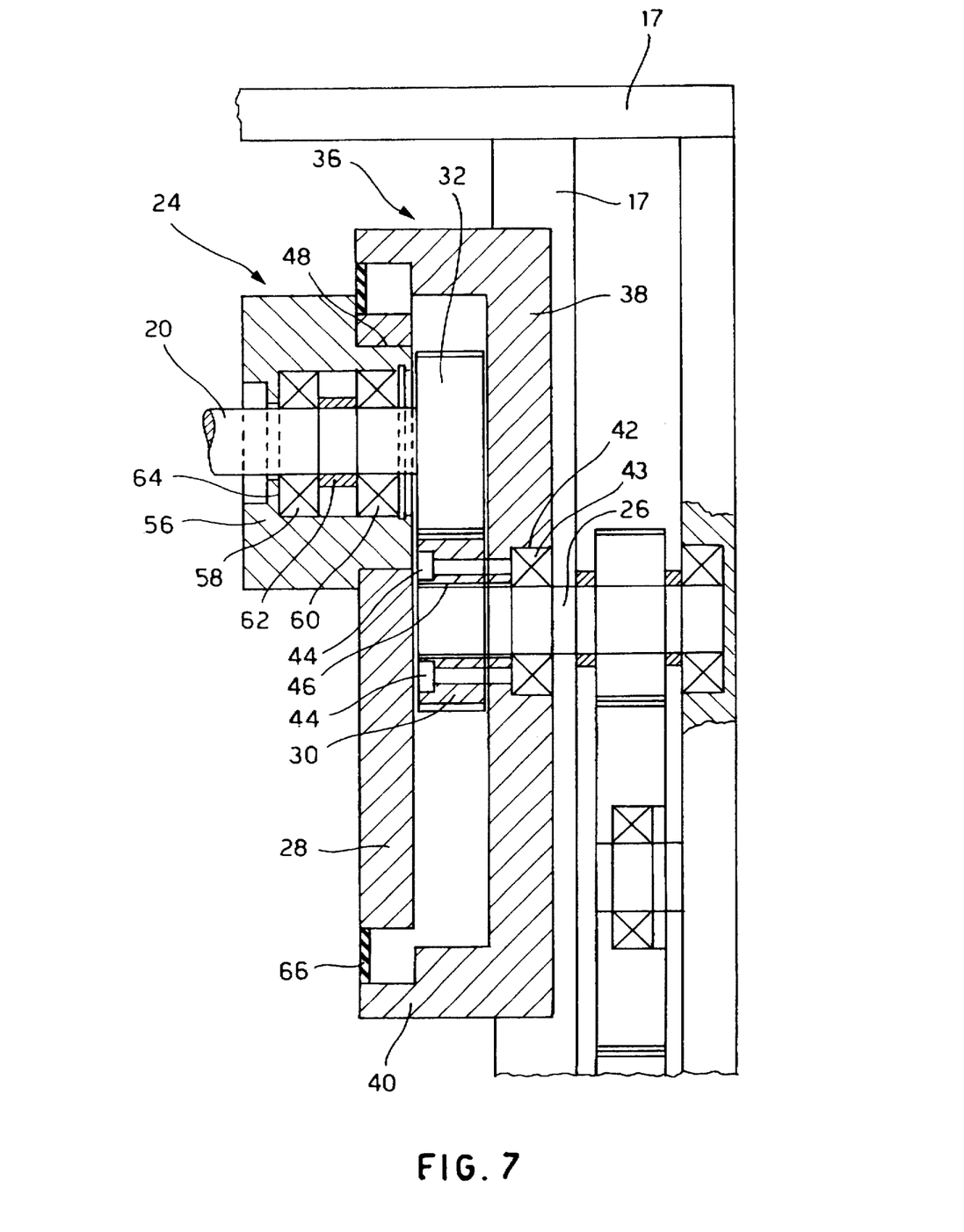
FIG. 7 is an enlarged sectioned view of a detail of FIG. 6 relating to the connection of the drive shaft to the element holding the welding part, showing in particular the fixed cogged wheel and the cogged wheel integral with the element supporting the welding part.
Figure 8:
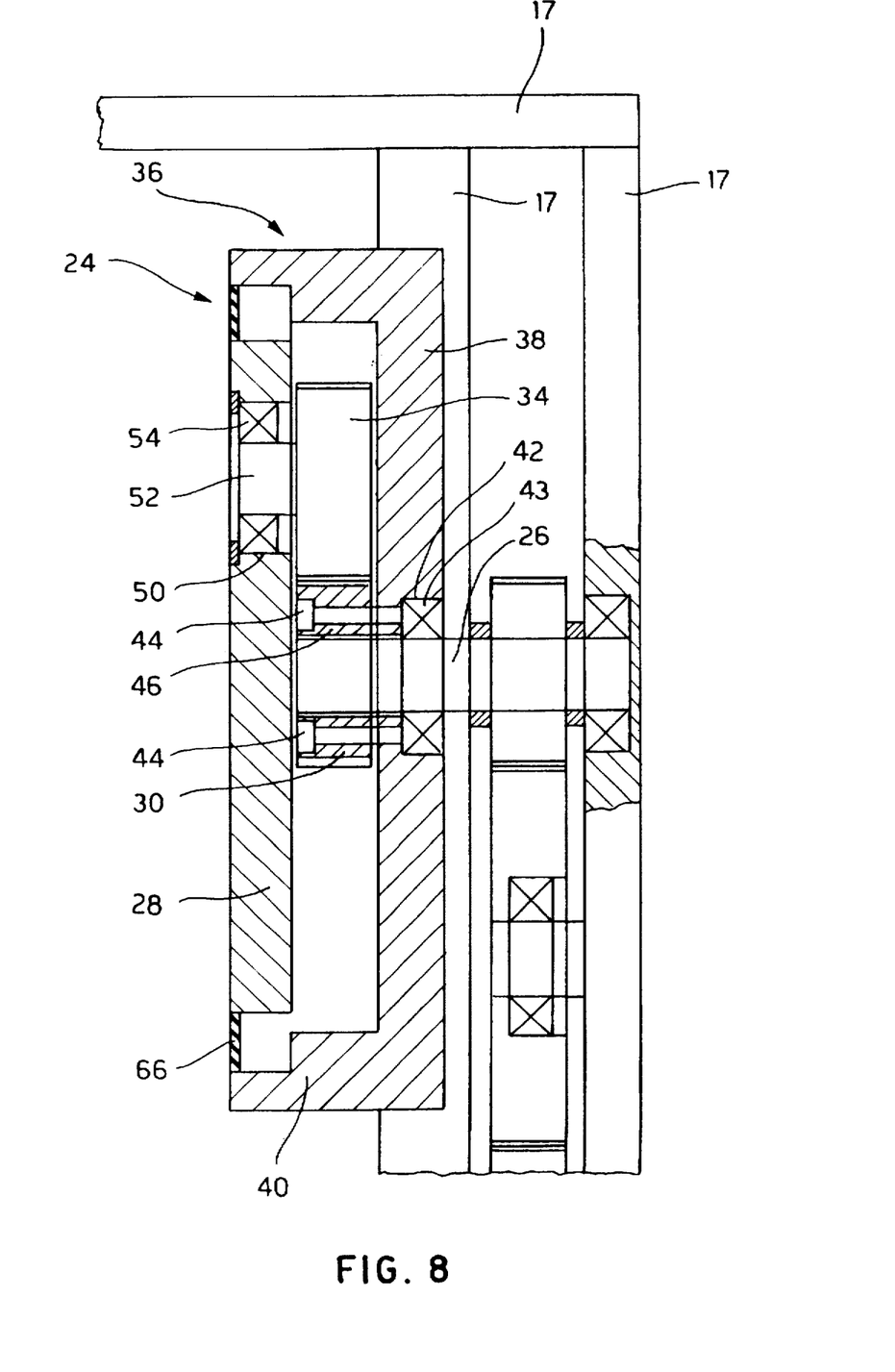
FIG. 8 is an enlarged sectioned view similar to that of FIG. 7, showing however the fixed cogged wheel and the intermediate cogged planet wheel.

Referring also to the subsequent FIGS. 6, 7 and 8, it can be seen how, according to the present invention, each of said assemblies 24 comprises a shaft 26 for driving rotation, a train-holder element 28 connected integrally to said drive shaft 26 to rotate together with the latter, a fixed cogged sun wheel 30, coaxial to said drive shaft 26, a first cogged planet wheel 32 integral with said element for supporting the welding part 20 and carried by said train-holder element 28 in order to rotate freely around its own axis and a second intermediate cogged planet wheel 34, also carried by said train-holder element 28 so as to rotate freely around its own axis. As shown, said intermediate planet wheel 34 meshes on said fixed cogged sun wheel 30 and with said first cogged planet wheel 32 of the shaft for carrying the welding part. Said cogged wheel 32 does not mesh with said fixed cogged wheel 30.

According to the preferred embodiment of the present invention shown, said fixed cogged sun wheel 30, said cogged planet wheel 32, integral with the welding part support, and said intermediate cogged planet wheel 34, all have the same pitch diameter. However, according to the present invention, it is possible to use cogged wheels of different diameters or with a greater number of cogged wheels.

As shown particularly in FIG. 2, said cogged planet wheels 32, 34 are arranged angularly distanced one from the other and the radial distance between said cogged planet wheel 32 of the welding part and said fixed cogged wheel 30 is slightly greater than the radial distance between said intermediate cogged planet wheel 34 and said cogged wheel 30 so that there is no meshing between the fixed wheel 30 and the wheel 32. In this way a particularly compact arrangement which extends minimally in the radial direction of the drive assembly is obtained.

Moreover, according to the preferred embodiment shown, said fixed cogged sun wheel 30, said cogged planet wheel 32, integral with the support of the welding part, and said intermediate cogged planet wheel 34 are substantially coplanar one with the other, so as to occupy a small volume also in terms of width.

In a preferred manner, moreover, each of said support elements 20 of said welding parts 18 is in the form of an elongated stem positioned transversely in relation to the strip to be welded.

As shown fully in FIG. 7, according to the present invention, a body for containing said cogged wheels is also provided, integral with said support structure 17 and in the form of a box 36 having a back wall 38 and a cylindrical side wall 40. The box 36 is open on the opposite side to the back one and has, in said back wall 38, a central hole 42 for the passage inside the box-shaped body of said drive shaft 26 which is supported by means of a suitable bearing 43 appropriately housed in said hole 42.

As shown, said fixed cogged wheel 30 is connected by means of suitable screws 44 to the back wall 38 of the containing box 36 at said hole 42 for the passage of said drive shaft 26. The fixed cogged sun wheel 30 is likewise provided with an axial hole 46 which is traversed by said drive shaft 26 which does not touch the cylindrical wall of said hole 46.

According to a further advantageous feature of the present invention, said train-holder element 28 is in the form of a flange, coaxial to said drive shaft 26 with which it is integral, which defines in this way also a cover for closing said box-shaped body 36.

Figure 9:
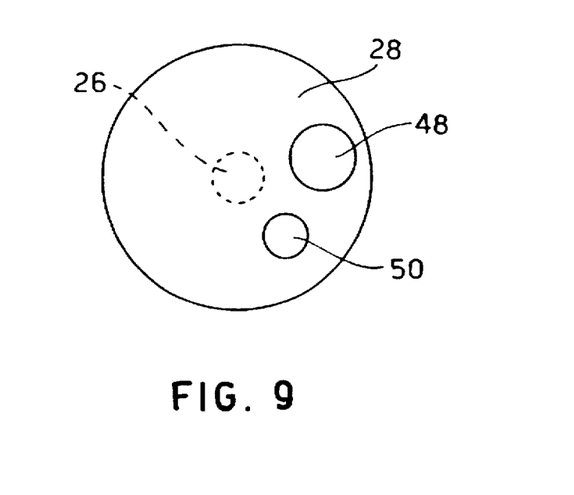
FIG. 9 is a front view of one of the drive flanges integral with one of the drive shafts for driving rotation of the welding parts.

As shown also in FIG. 9, said drive flange 28 has a first eccentric through hole 48 for the passage of said stem 20 for supporting the welding part which extends inside the box-shaped body 36. The flange 28 also has a second hole 50 for supporting the small support shaft of said intermediate cogged planet wheel 34. As shown in FIG. 8, said small shaft 52 for supporting the wheel 34 is shaped somewhat short and is supported, freely rotatingly, at its other end, by said flange 28 by means of a suitable bearing 54 adequately restrained in said second eccentric hole 50 of said flange 28.

As shown in FIG. 7, said drive flange 28 has, at said first eccentric hole 48 for the stem 20 holding the welding part, a suitable seat 56 in the form of a hollow cylindrical element which extends from said drive flange 28, with which it is integral, towards the exterior of the box containing the gear, which houses two bearings 58, 60, maintained distanced by means of a suitable spacer element 62, and is provided with an annular shoulder 64 for the support of the external bearing 58 and suitable restraining elements for the bearing 60.

Between the outside edge of said drive flange 28 whereto the internal edge of the circular wall is attached, a rubber oil seal ring 66 is provided for the substantially hermetic closure of said box 36 for housing the cogged wheels.

The whole system is driven by means of a drive assembly which comprises, as shown in FIG. 5, at one end of the welding device, a main shaft 102 actuated to rotate by means of a suitable motor (not shown). Said main shaft 102 holds, at the opposite ends, a first and respectively second pulley 104, 104 connected by means of respective belts 106, 106 to corresponding pulleys 108, 108.

Each pulley 108 is held by a shaft which holds at the opposite end a first driving gear 110 of a respective transmission system housed between two side panels of the support structure 17 of the welding device. There are substantially two identical lateral transmission system, in each of which said first driving gear 110 meshes with a second transmission gear 112, which in turn meshes with a third gear 114. This latter gear 114 is integrally attached to a drive shaft 26 to drive it to rotate. Said third gear 114 meshes also with a fourth transmission gear 116 in turn meshing with a fifth transmission gear 118, which in turn meshes with a sixth gear 120. The latter gear 120 is integrally attached to the other drive shaft 26 to drive it to rotate. Obviously all said gears are dimensioned in such a way as to actuate the drive shafts 26 at the same angular speed.

FIGS. 5 and 6 also show that said welding parts 18 are attached to the respective support stem 20 by mobile means, more particularly yielding means for extension of the contact between the welding parts. In this way the welding plates, instead of performing a perfectly circular movement, have in fact generally circular trajectories which, when the welding plates are moved reciprocally together to weld the strip 12 (see FIG. 2), comprise a rectilinear contact section. Thus an extension of the contact time between the bars is obtained which allows more accurate welding.

According to the present invention said mobile means for supporting the welding parts 18 are means for absorbing the shock of impact and thrust between the welding parts. Said means for each of said two welding elements 18 comprise at least one of respective first and second cylinders 202 and 204, transversely distanced one from the other and which can be actuated by means of a pressurised fluid, preferably compressed air.

Said cylinders 202, 204, which can be actuated by a fluid, comprise a respective piston or plunger 206, 208, integral by means of stems 210 and 212 with the respective welding part 18 and a respective compression chamber 214, 216, each containing the respective piston. The length of the rectilinear contact section, that is to say the time of contact between the welding bars, can be changed simply by changing the length of the stems of the pistons of the welding parts.

Each of said pressure chambers 214, 216 is connected via a respective conduit 218, 220 to a plenum element 222, capable of containing a certain quantity of compressed fluid.

Said plenum 222 for the pressurised fluid allows the release therein of the pressure increase which is generated in the chambers of the cylinders 214, 216 at the time when said welding elements 18, 18 come into contact one with the other, achieving a shock-absorbing effect.

The pressurised fluid, supplied by a network 224 or another source, is fed into the plenum 222 by means of a suitable pressure regulator 226 and the pressure inside the plenum is measured by means of a pressure gauge 228.

230 in FIG. 5 schematically denotes a means for setting the pressure which said regulator 226 admits inside the plenum 222.

This means 230 could be actuated manually by the operator according to the production needs of the time, obtaining the necessary information from the pressure gauge 228, or automatically by suitable computerised control means.

Briefly, the operation of the system is the following:

when the main shaft 102 is driven to rotate, it actuates, via the two lateral transmission systems, said drive shafts 26.

As shown fully in FIGS. 2 to 4, said drive shafts 26, by rotating, cause the respective drive flanges 28 to rotate along the arrow FO of FIG. 2. Each of these flanges or train-holder elements 28 drives the respective intermediate planet wheel 34 to rotate around the respective fixed wheel 30. These planet wheels 34, by meshing with the respective fixed cogged sun wheels 30, rotate also on themselves in the same angular direction as the drive flange 28, illustrated by the arrow F1 in FIG. 2. Said planet wheels 32 of the element for supporting the welding part are also driven to rotate by said drive flange 28 so as to rotate around respective fixed sun wheels 30. Each planet wheel 32 meshes however with the respective intermediate planet wheel 34 and is therefore forced by the latter to rotate on itself in an opposite angular direction to that of said flange, that is to say in the angular direction illustrated by the arrow F2 in FIG. 2. This allows the welding parts 18 to be moved along opposite circular trajectories, illustrated by the dotted and dashed arrow FS in FIG. 2, at the same time always remaining turned in the same angular directions, in this case said welding parts rotate in the same direction as the drive shafts 26, always remaining in a horizontal position, as illustrated in detail by the subsequent positions assumed by said welding parts 18 shown in FIGS. 2 to 4.

It must naturally be understood that what has been written and shown with reference to the preferred embodiment of the present invention has been given purely by way of a non-limiting example of the principle claimed.

What is claimed is:

1. A device for welding bags or packages in a heat-sealable plastic material suitable for welding opposite edges of a tubular strip which is longitudinally fed and filled in sequence with an appropriate portion of product; said welding device comprising a support structure (17), at least two transverse welding parts (18, 18), arranged on opposite sides of said strip and held by respective support elements (20, 20), rotatingly mobile along circular trajectories in opposite angular directions and means (24, 24) for driving the circular movement of said support elements (20, 20); wherein said means (24, 24) for driving the circular motion of said elements (20, 20) for supporting the welding part comprise, for each of said welding parts, at least one rotation driving shaft (26); a train-holder (28) element connected integrally to said drive shaft (26) to rotate together with the latter; a fixed cogged sun wheel (30), coaxial to said drive shaft (26); a first cogged planet wheel (32) integral with said element (20) for supporting the welding part (18) and connected to said train-holder element (28) so as to be driven to rotate with the latter and rotate freely around its own axis; second intermediate cogged planet wheel (34) connected to said train-holder element (28) so as to be driven to rotate with the latter and rotate freely around its own axis, said intermediate planet wheel (34) meshing on said fixed cogged sun wheel (30) and with said first cogged planet wheel (30) of the shaft (24) holding the welding part (18) in such a way that, following rotation of said drive shaft (26), said intermediate planet wheel (34), rotating on said fixed sun wheel (30), makes said planet wheel (32) of the element (20) supporting the welding part (18) rotate so as to make the respective welding part (18) perform circular trajectories, always remaining turned in the same angular direction.

2. Welding device according to claim 1, wherein said fixed cogged sun wheel (30), said cogged planet wheel (32) integral with the support (20) of the welding part (18) and said intermediate cogged planet wheel (34) are arranged substantially coplanarly one with the other.

3. Welding device according to claim 1, wherein each of said elements (20) for supporting said welding parts (18) is in the form of an elongated stem.

4. Welding device according to claim 1, wherein said fixed cogged sun wheel (30), said cogged planet wheel (32) integral with the support (20) of the welding part (18) and said intermediate cogged (34) planet wheel all have the same pitch diameter.

5. Welding device according to claim 4, wherein said first cogged planet wheel (32) and said second intermediate cogged wheel (32) are arranged angularly distanced one from the other and in that the radial distance between said cogged planet wheel (32) of the welding part (18) and said fixed cogged wheel (30) is slightly greater than the radial distance between said intermediate cogged planet wheel (34) and said fixed cogged wheel (30).

6. Welding device according to claim 1, wherein said fixed cogged sun wheel (30) has an axial hole (46) for the passage of said drive shaft (26).

7. Welding device according to claim 1, wherein said support structure (17) has a body for containing said cogged wheels in the form of a box (36) open on one side and having a rear hole (42) for the passage inside said box-shaped body (36) of said drive shaft (26); and in that said train-holder element (28) is in the form of a flange, coaxial to said drive shaft (26), defining a cover for closing said box-shaped body (36).

8. Welding device according to claim 7, wherein said flange has an eccentric hole (50) which allows said support stem (20) of the welding part (18) to extend inside the box-shaped body (36), with said stem (20) which is carried by said drive flange (28) freely rotating around its own axis.

9. Welding device according to claim 7, wherein between the external edge of said drive flange (28) and the internal edge of the circular wall and resting on the latter, an oil seal ring (66) is provided to close, substantially hermetically, said box (36) for housing the meshing cogged wheels.

10. Welding device according to claim 1, wherein means are provided for supporting in a mobile manner said welding parts (18) on respective support elements (20).

11. Welding device according to claim 10, wherein said mobile support means are yielding means for the extension of contact between the welding bars (18, 18).

12. Welding device according to claim 1, wherein said means for supporting said welding part (18) on the respective support elements (20) are means for absorbing the shock of the impact and thrust between the welding parts.

13. Welding device according to claim 12, wherein said means for absorbing the shock of the impact and thrust between the welding parts (18) are means (202, 204, 206, 208, 210, 212) using a pressurised fluid.

14. Welding device according to claim 13, wherein means (226) are provided for controlling the pressure of said fluid.

* * * * *